(12) United States Patent
Singh

(10) Patent No.: US 9,091,330 B2
(45) Date of Patent: Jul. 28, 2015

(54) MULTI-SPEED TRANSMISSION

(71) Applicant: GM Global Technology Operations LLC, Detroit, MI (US)

(72) Inventor: Tejinder Singh, Commerce Township, MI (US)

(73) Assignee: GM GLOBAL TECHNOLOGY OPERATIONS, LLC, Detroit, MI (US)

(*) Notice: Subject to any disclaimer, the term of this patent is extended or adjusted under 35 U.S.C. 154(b) by 29 days.

(21) Appl. No.: 14/036,708

(22) Filed: Sep. 25, 2013

(65) Prior Publication Data

US 2015/0087467 A1     Mar. 26, 2015

(51) Int. Cl.
*F16H 3/68* (2006.01)
*F16H 3/62* (2006.01)
*F16H 3/66* (2006.01)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2051* (2013.01)

(58) Field of Classification Search
None
See application file for complete search history.

(56) References Cited

U.S. PATENT DOCUMENTS

| 6,764,425 B2 * | 7/2004 | Lee et al. ............... 475/280 |
| 2006/0270516 A1 * | 11/2006 | Klemen ............... 475/280 |
| 2007/0066440 A1 * | 3/2007 | Kitahara et al. ............... 475/331 |

* cited by examiner

*Primary Examiner* — Erin D Bishop

(57) ABSTRACT

A transmission has an input member, an output member, at least four planetary gear sets, a plurality of coupling members and a plurality of torque transmitting devices. Each of the planetary gear sets includes first, second and third members. The torque transmitting devices include clutches, a one-way clutch and brakes actuatable in combinations of two to establish a plurality of forward gear ratios and at least one reverse gear ratio.

26 Claims, 2 Drawing Sheets

| GEAR STATE | GEAR RATIO | CLUTCHING ELEMENTS | | | | | | | |
|---|---|---|---|---|---|---|---|---|---|
| | | 24 | 26 | 38 | 30 | 34 | 36 | 32 | 28 |
| REV | -3.390 | X | | | | X | | | |
| N | | | | | | | | | |
| 1ST | 4.650 | | | X | | C | X | | |
| 2ND | 3.184 | | | X | | | | X | |
| 3RD | 2.831 | | | X | X | | | | |
| 4TH | 2.295 | | | X | | | | | X |
| 5TH | 1.843 | X | | X | | | | | |
| 6TH | 1.386 | | X | X | | | | | |
| 7TH | 1.000 | X | X | | | | | | |
| 8TH | 0.722 | | X | | X | | | | |
| 9TH | 0.623 | | X | | | | | X | |

X = ON - ENGAGED CARRYING TORQUE

FIG. 3

MULTI-SPEED TRANSMISSION

FIELD

The invention relates generally to a multiple speed transmission having a plurality of planetary gear sets and a plurality of torque transmitting devices and more particularly to a transmission having nine or more speeds, at least four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes. The clutches and brakes can be of any type: friction clutches, dog clutches or synchronizers. The brakes in an embodiment of the present invention are friction band brakes. Alternatively, a subset of the brakes are selectable one-way clutches or brakes.

In an embodiment of the present invention, the first, second, third and fourth planetary gear sets each having a sun gear, a carrier member and a ring gear.

In still another embodiment of the present invention, the input member is continuously connected for common rotation with the sun gear of the third planetary gear set.

In still another embodiment of the present invention, the output member is continuously connected for common rotation with the carrier member of the first planetary gear set.

In still another embodiment of the present invention, a first interconnecting member continuously interconnects the ring gear of the first planetary gear set with the ring gear of the third planetary gear set.

In still another embodiment of the present invention, a second interconnecting member continuously interconnects the carrier member of the first planetary gear set with the ring gear of the second planetary gear set and the ring gear of the fourth planetary gear set.

In still another embodiment of the present invention, a third interconnecting member continuously interconnects the carrier member of the third planetary gear set with the carrier member of the second planetary gear set and the carrier member of the fourth planetary gear set.

In yet another embodiment of the present invention, a first torque transmitting mechanism is selectively engageable to interconnect the sun gear of the second planetary gear set with the input member and the sun gear of the third planetary gear set.

In yet another embodiment of the present invention, a second torque transmitting mechanism is selectively engageable to interconnect the carrier member of the second planetary gear set, the carrier member of the third planetary gear set and the carrier member of the fourth planetary gear set with the input member and the sun gear of the third planetary gear set.

In yet another embodiment of the present invention, a third torque transmitting mechanism is selectively engageable to interconnect the sun gear of the second planetary gear set with the sun gear of the fourth planetary gear set.

In yet another embodiment of the present invention, the third torque transmitting mechanism is configured to interconnect any two nodes or members of the second planetary gear set and the fourth planetary gear set.

In yet another embodiment of the present invention, the third torque transmitting mechanism is eliminated to produce an eight speed transmission.

In yet another embodiment of the present invention, a fourth torque transmitting mechanism is selectively engageable to interconnect the sun gear of the second planetary gear set with the stationary member.

In yet another embodiment of the present invention, the fourth torque transmitting mechanism is eliminated to produce a seven speed transmission.

In yet another embodiment of the present invention, a fifth torque transmitting mechanism is selectively engageable to interconnect the sun gear of the fourth planetary gear set with the stationary member.

In yet another embodiment of the present invention, a sixth torque transmitting mechanism is selectively engageable to interconnect the carrier member of the third planetary gear set, the carrier member of the second planetary gear set and the carrier member of the fourth planetary gear set with the stationary member.

In yet another embodiment of the present invention, a seventh torque transmitting mechanism is selectively engageable to interconnect the carrier member of the third planetary gear set, the carrier member of the second planetary gear set and the carrier member of the fourth planetary gear set with the stationary member.

In yet another embodiment of the present invention, an eighth torque transmitting mechanism is selectively engageable to interconnect the sun gear of the first planetary gear set with the stationary member.

In yet another embodiment of the present invention, the torque transmitting mechanisms are selectively engageable in combinations of at least two to establish a plurality of forward speed ratios and at least one reverse speed ratio between the input member and the output member.

In yet another embodiment of the present invention, the transmission has different types of starting devices including a friction launch clutch, a torque converter or fluid coupling or the like.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1, 2 and 3.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a second component or element of the third planetary gear set. A second component or element of the first planetary gear set is permanently coupled a third component or element of the second planetary gear set and a third component or element of the fourth planetary gear set. A third component or element of the third planetary gear set is permanently coupled to a second component or element of the second planetary gear set and a second component or element of the fourth planetary gear set.

Figure 1:
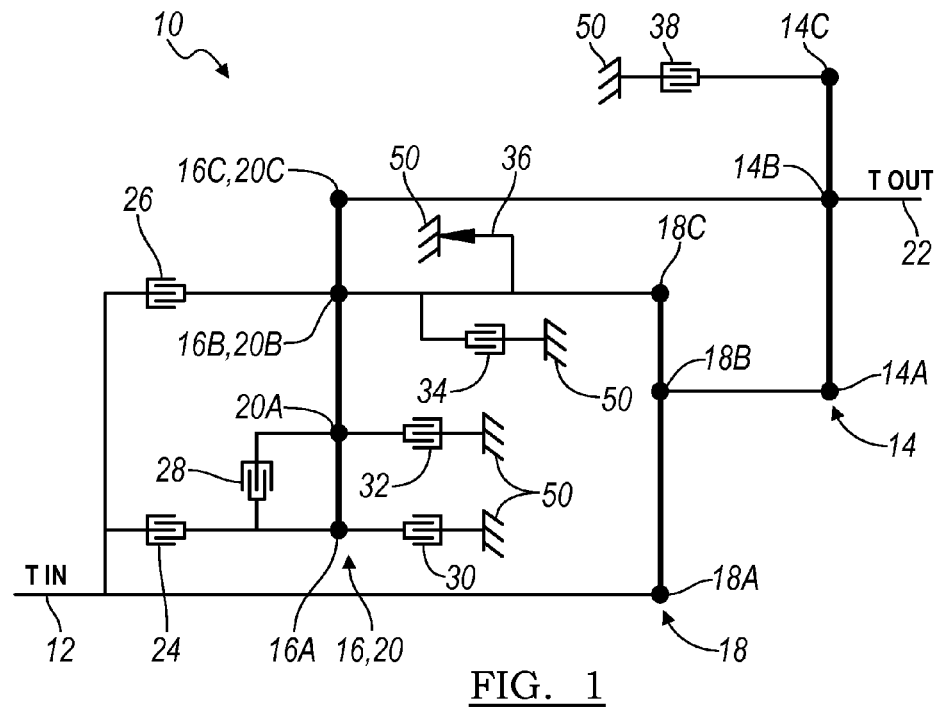
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. However, two three node levers may be combined into a single four node lever when two of the three components of the planetary gear sets are interconnected. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second and fourth planetary gear sets 16 and 20 are combined into a single lever referenced as 16, 20 that has four nodes: a first node 16A, a second node 20A, a third node 16B, 20B and a fourth node 16C, 20C. The third planetary gear set 18 has three nodes: a first node 18A, a second node 18B and a third node 18C.

The input member 12 is continuously coupled to the first node 18A of the third planetary gear set 18. The output member 22 is continuously coupled to the second node 14B of the first planetary gear set 14, the third node 16C of the second planetary gear set 16 and the third node 20C of the fourth planetary gear set 20. The first node 14A of the first planetary gear set 14 is coupled to the second node 18B of the third planetary gear set 18. The second node 14B of the first planetary gear set 14 is coupled to the third node 16C of the second planetary gear set 16 and the third node 20C of the fourth planetary gear set 20. The third node 18C of the third planetary gear set 18 is coupled to the second node 16B of the second planetary gear set 16 and the second node 20B of the fourth planetary gear set 20.

A first clutch 24 selectively connects the first node 16A of the second planetary gear set 16 with the input member or shaft 12 and the first node 18A of the third planetary gear set 18. A second clutch 26 selectively connects the third node 16B, 20B of the combined lever of the second planetary gear set 16 and the fourth planetary gear set 20 with the input member or shaft 12 and the first node 18A of the third planetary gear set 18. A third clutch 28 selectively connects the first node 16A of the combined lever of the second planetary gear set 16 and the fourth planetary gear set 20 with the second node 20A of the combined lever of the second planetary gear set 16 and the fourth planetary gear set 20. A first brake 30 selectively connects the first node 16A of the combined lever of the second planetary gear set 16 and the fourth planetary gear set 20 with a stationary member or transmission housing 50. A second brake 32 selectively connects the second node 20A of the combined lever of the second planetary gear set 16 and the fourth planetary gear set 20 with a stationary member or transmission housing 50. A third brake 34 selectively connects the third node 16B, 20B of the combined lever of the second planetary gear set 16 and the fourth planetary gear set 20 and the third node 18C of the third planetary gear set 18 with the stationary member or transmission housing 50. A one way clutch 36 selectively connects the third node 16B, 20B of the combined lever of the second planetary gear set 16 and the fourth planetary gear set 20 and the third node 18C of the third planetary gear set 18 with the stationary member or transmission housing 50. A fourth brake 38 selectively connects the third node 14C of the first planetary gear set 14 with the stationary member or transmission housing 50.

Figure 2:
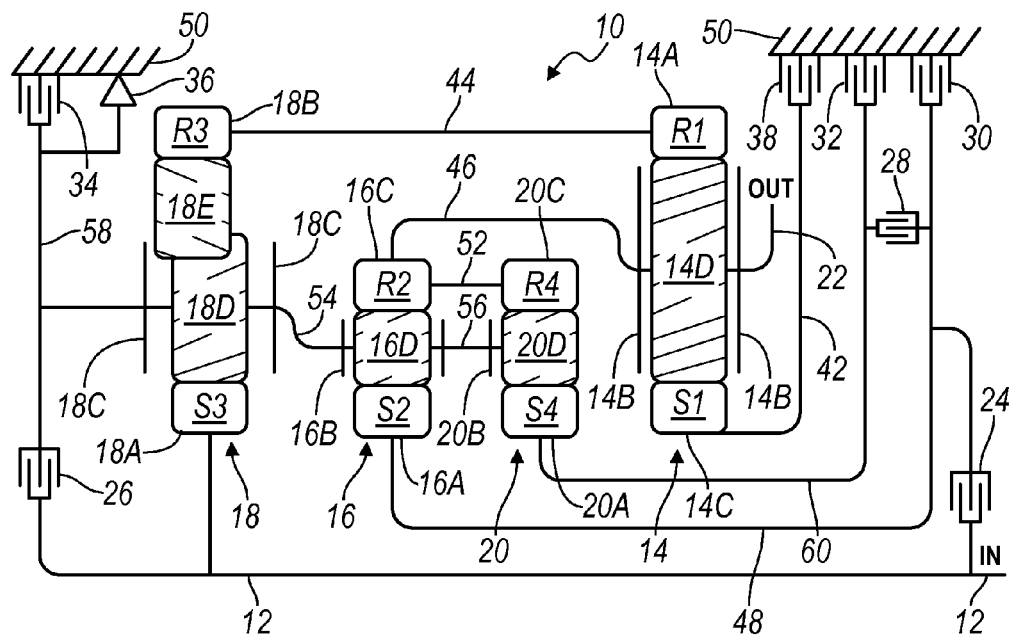
FIG. 2 is a diagrammatic illustration of an embodiment of a nine speed transmission according to the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with a third shaft or interconnecting member 46. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a fourth shaft or interconnecting member 48. The ring gear member 16C is connected for common rotation with the third shaft or interconnecting member 46 and a fifth shaft or interconnecting member 52. The planet carrier member 16B is connected for common rotation with a sixth shaft or interconnecting member 54 and a seventh shaft or interconnecting member 56. The planet gears 16D are each configured to intermesh with both the sun gear member 16A and the ring gear member 16C.

The planetary gear set 18 includes a sun gear member 18A, a ring gear member 18B and a planet gear carrier member 18C that rotatably supports a first set of planet gears 18D (only one of which is shown) and a second set of planet gears 18E (only one of which is shown). The sun gear member 18A is connected for common rotation with the input shaft or member 12. The ring gear member 18B is connected for common rotation with the second shaft or interconnecting member 44. The planet carrier member 18C is connected for common rotation with the sixth shaft or interconnecting member 54 and an eighth shaft or interconnecting member 58. The first set of planet gears 18D are each configured to intermesh with both the sun gear member 18A and the second set of planet gears 18E. The second set of planet gears 18E are each configured to intermesh with both the ring gear member 18B and the first set of planet gears 18D.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with a ninth shaft or interconnecting member 60. The ring gear member 20C is connected for common rotation with the fifth shaft or interconnecting member 52. The planet carrier member 20B is connected for common rotation with the seventh shaft or interconnecting member 56. The planet gears 20D are each configured to intermesh with both the sun gear member 20A and the ring gear member 20C.

The input shaft or member 12 is continuously connected to an engine (not shown) or to a turbine of a torque converter (not shown), friction launch clutch, fluid coupling or the like. The output shaft or member 22 is continuously connected with the final drive unit or transfer case (not shown).

The torque-transmitting mechanisms or clutches 24, 26, 28 and brakes 30, 32, 34 and 38 and one-way clutch 36 allow for selective interconnection of the shafts or interconnecting members, members of the planetary gear sets and the housing. Clutches 24, 26, 28 and brakes 30, 32, 34 and 38 can be of any type: friction clutches, dog clutches or synchronizers. For example, the first clutch 24 is selectively engageable to connect the input shaft or member 12 with the fourth shaft or interconnecting member 48. The second clutch 26 is selectively engageable to connect the input shaft or member 12 with the eighth shaft or interconnecting member 58. The third clutch 28 is selectively engageable to connect the fourth shaft or interconnecting member 48 with the ninth shaft or interconnecting member 60. However, alternatively the present invention contemplates that clutch 28 may be configured to interconnect any member of second planetary gear set 16 with any member of the fourth planetary gear set 20 The first brake 30 is selectively engageable to connect the fourth shaft or interconnecting member 48 with the stationary element or the transmission housing 50 in order to restrict the member 48 from rotating relative to the transmission housing 50. The second brake 32 is selectively engageable to connect the ninth shaft or interconnecting member 60 with the stationary element or the transmission housing 50 in order to restrict the member 60 from rotating relative to the transmission housing 50. The third brake 34 is selectively engageable to connect the eighth shaft or interconnecting member 58 with the stationary element or the transmission housing 50 in order to restrict the member 58 from rotating relative to the transmission housing 50. Alternatively, the present invention contemplates replacing brake 34 with a selectable one-way clutch. The fourth brake 38 is selectively engageable to connect the first shaft or interconnecting member 42 with the stationary element or the transmission housing 50 in order to restrict the member 42 from rotating relative to the transmission housing 50. The one-way clutch 36 is selectively engageable to connect the eighth shaft or interconnecting member 58 with the stationary element or the transmission housing 50 based on the rotation of the eighth shaft or interconnecting member 58 in order to restrict the member 58 from rotating relative to the transmission housing 50.

Referring now to FIG. 2 and FIG. 3, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 30, second brake 32, third brake 34, one-way clutch 36 and fourth brake 38), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear (REV1), first clutch 24 and the third brake 34 are engaged or activated. The first clutch 24 connects the input shaft or member 12 with the fourth shaft or interconnecting member 48. The third brake 34 connects the eighth shaft or interconnecting member 58 with the stationary element or the transmission housing 50 in order to restrict the member 58 from rotating relative to the transmission housing 50. Likewise, the nine forward ratios are achieved through different combinations of clutch and brake engagement, as shown in FIG. 3.

It will be appreciated that the foregoing explanation of operation and gear states of the nine speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. Moreover, the present invention contemplates eliminating clutch 28 to produce an eight speed transmission and eliminating clutch 30 to produce a seven speed transmission.

The description of the invention is merely exemplary in nature and variations that do not depart from the gist of the invention are intended to be within the scope of the invention. Such variations are not to be regarded as a departure from the spirit and scope of the invention.

The invention claimed is:
1. A transmission comprising:
an input member;
an output member;

first, second, third and fourth planetary gear sets each having first, second and third members;
three interconnecting members each continuously interconnecting a member of one of the first, second, third and fourth planetary gear sets with another member of one of the first, second, third and fourth planetary gear sets; and
eight torque transmitting mechanisms wherein three of the eight torque transmitting mechanisms are each selectively engageable to interconnect at least one of the first, second and third members of one of the first, second, third, and fourth planetary gear sets with at least one other of the first, second, third members of one of the first, second, third, and fourth planetary gear sets and wherein five of the eight torque transmitting mechanisms are each selectively engageable to interconnect at least one of the first, second and third members of one of the first, second, third, and fourth planetary gear sets with a stationary member, and
wherein the eight torque transmitting mechanisms are selectively engageable in combinations of at least two to establish at least nine forward speed ratios and at least one reverse speed ratio between the input member and the output member, a first and a second of the eight torque transmitting mechanisms are each selectively engageable to interconnect one of the first, second, and third members of one of the first, second, third, and fourth planetary gear sets with the input member.

2. The transmission of claim 1 wherein the three interconnecting members further comprises a first interconnecting member continuously interconnecting the first member of the first planetary gear set with the second member of the third planetary gear set, a second interconnecting member continuously interconnecting the second member of the first planetary gear set with the third member of the second planetary gear set and the third member of the fourth planetary gear set and a third interconnecting member continuously interconnecting the third member of the third planetary gear set with the second member of the second planetary gear set and the second member of the fourth planetary gear set.

3. The transmission of claim 2 wherein the first of the eight torque transmitting mechanisms is selectively engageable to interconnect the first member of the second planetary gear set with the input member and the first member of the third planetary gear set.

4. The transmission of claim 3 wherein the second of the eight torque transmitting mechanisms is selectively engageable to interconnect the second member of the second planetary gear set and the second member of the fourth planetary gear set with the input member and the first member of the third planetary gear set.

5. The transmission of claim 4 wherein a third of the eight torque transmitting mechanisms is selectively engageable to interconnect the first member of the second planetary gear set with the first member of the fourth planetary gear set.

6. The transmission of claim 5 wherein a fourth of the eight torque transmitting mechanisms is selectively engageable to interconnect the first member of the second planetary gear set with the stationary member.

7. The transmission of claim 6 wherein a fifth of the eight torque transmitting mechanisms is selectively engageable to interconnect the first member of the fourth planetary gear set with the stationary member.

8. The transmission of claim 7 wherein a sixth of the eight torque transmitting mechanisms is selectively engageable to interconnect the third member of the third planetary gear set, the second member of the second planetary gear set and the second member of the fourth planetary gear set with the stationary member.

9. The transmission of claim 7 wherein a seventh of the eight torque transmitting mechanisms is a one-way clutch that is selectively engageable to interconnect the third member of the third planetary gear set, the second member of the second planetary gear set and the second member of the fourth planetary gear set with the stationary member.

10. The transmission of claim 9 wherein an eighth of the eight torque transmitting mechanisms is selectively engageable to interconnect the third member of the first planetary gear set with the stationary member.

11. The transmission of claim 1 wherein the input member is continuously connected for common rotation with the first member of the third planetary gear set.

12. The transmission of claim 1 wherein the output member is continuously connected for common rotation with the second member of the first planetary gear set.

13. The transmission of claim 1 wherein the third member of the first planetary gear set, the first member of the second planetary gear set, the first member of the third planetary gear set and the first member of the fourth planetary gear set are sun gears, the second members of the first, second and fourth planetary gear sets and the third member of the third planetary gear set are carrier members and the first member of the first planetary gear set, the third member of the second planetary gear set, the second member of the third planetary gear set and the third member of the fourth planetary gear set are ring gears.

14. A transmission comprising:
an input member;
an output member;
first, second, third and fourth planetary gear sets each having first, second and third members and wherein the third member of the third planetary gear set rotatably supports a first and a second set of planet gears;
a first interconnecting member continuously interconnecting the first member of the first planetary gear set with the second member of the third planetary gear set;
a second interconnecting member continuously interconnecting the second member of the first planetary gear set with the third member of the second planetary gear set and the third member of the fourth planetary gear set;
a third interconnecting member continuously interconnecting the third member of the third planetary gear set with the second member of the second planetary gear set and the second member of the fourth planetary gear set; and
eight torque transmitting mechanisms each selectively engageable to interconnect at least one of the first, second, and third members of one of the first, second, third, and fourth planetary gear sets with at least one other of the first, second, third members of one of the first, second, third, and fourth planetary gear sets and a stationary member, and
wherein the eight torque transmitting mechanisms are selectively engageable in combinations of at least two to establish a plurality of forward speed ratios and at least one reverse speed ratio between the input member and the output member.

15. The transmission of claim 14 wherein a first of the six torque transmitting mechanisms is selectively engageable to interconnect the first member of the second planetary gear set with the input member and the first member of the third planetary gear set.

16. The transmission of claim 15 wherein a second of the six torque transmitting mechanisms is selectively engageable to interconnect the second member of the second planetary gear set and the second member of the fourth planetary gear set with the input member and the first member of the third planetary gear set.

17. The transmission of claim 16 wherein a third of the eight torque transmitting mechanisms is selectively engageable to interconnect the first member of the second planetary gear set with the first member of the fourth planetary gear set.

18. The transmission of claim 17 a fourth of the eight torque transmitting mechanisms is selectively engageable to interconnect the first member of the second planetary gear set with the stationary member.

19. The transmission of claim 18 wherein a fifth of the eight torque transmitting mechanisms is selectively engageable to interconnect the first member of the fourth planetary gear set with the stationary member.

20. The transmission of claim 19 wherein a sixth of the eight torque transmitting mechanisms is selectively engageable to interconnect the third member of the third planetary gear set, the second member of the second planetary gear set and the second member of the fourth planetary gear set with the stationary member.

21. The transmission of claim 19 wherein a seventh of the eight torque transmitting mechanisms is a one-way clutch that is selectively engageable to interconnect the third member of the third planetary gear set, the second member of the second planetary gear set and the second member of the fourth planetary gear set with the stationary member.

22. The transmission of claim 21 wherein an eighth of the eight torque transmitting mechanisms is selectively engageable to interconnect the third member of the first planetary gear set with the stationary member.

23. The transmission of claim 14 wherein the input member is continuously connected for common rotation with the first member of the third planetary gear set.

24. The transmission of claim 14 wherein the output member is continuously connected for common rotation with the second member of the first planetary gear set.

25. The transmission of claim 14 wherein the third member of the first planetary gear set, the first member of the second planetary gear set, the first member of the third planetary gear set and the first member of the fourth planetary gear set are sun gears, the second members of the first, second and fourth planetary gear sets and the third member of the third planetary gear set are carrier members and the first member of the first planetary gear set, the third member of the second planetary gear set, the second member of the third planetary gear set and the third member of the fourth planetary gear set are ring gears.

26. A transmission comprising:
an input member;
an output member;
first, second, third and fourth planetary gear sets each having a sun gear, a carrier member and a ring gear, wherein the input member is continuously connected for common rotation with the sun gear of the third planetary gear set, and wherein the output member is continuously connected for common rotation with the carrier member of the first planetary gear set;
a first interconnecting member continuously interconnecting the ring gear of the first planetary gear set with the ring gear of the third planetary gear set;
a second interconnecting member continuously interconnecting the carrier member of the first planetary gear set with the ring gear of the second planetary gear set and the ring gear of the fourth planetary gear set;
a third interconnecting member continuously interconnecting the carrier member of the third planetary gear set with the carrier member of the second planetary gear set and the carrier member of the fourth planetary gear set;
a first torque transmitting mechanism selectively engageable to interconnect the sun gear of the second planetary gear set with the input member and the sun gear of the third planetary gear set;
a second torque transmitting mechanism selectively engageable to interconnect the carrier member of the second planetary gear set, the carrier member of the third planetary gear set and the carrier member of the fourth planetary gear set with the input member and the sun gear of the third planetary gear set;
a third torque transmitting mechanism selectively engageable to interconnect the sun gear of the second planetary gear set with the sun gear of the fourth planetary gear set;
a fourth torque transmitting mechanism selectively engageable to interconnect the sun gear of the second planetary gear set with the stationary member;
a fifth torque transmitting mechanism selectively engageable to interconnect the sun gear of the fourth planetary gear set with the stationary member;
a sixth torque transmitting mechanism selectively engageable to interconnect the carrier member of the third planetary gear set, the carrier member of the second planetary gear set and the carrier member of the fourth planetary gear set with the stationary member;
a seventh torque transmitting mechanism configured as a one-way clutch selectively engageable to interconnect the carrier member of the third planetary gear set, the carrier member of the second planetary gear set and the carrier member of the fourth planetary gear set with the stationary member;
an eighth torque transmitting mechanism selectively engageable to interconnect the sun gear of the first planetary gear set with the stationary member, and
wherein the torque transmitting mechanisms are selectively engageable in combinations of at least two to establish a plurality of forward speed ratios and at least one reverse speed ratio between the input member and the output member.

* * * * *